(No Model.)

O. M. HIDDEN
KNOB ATTACHMENT.

No. 255,858. Patented Apr. 4, 1882.

Attest:
A. Barthel
E. Scully

Inventor:
Oliver M. Hidden
per Thos. S. Sprague
Att'y

UNITED STATES PATENT OFFICE.

OLIVER M. HIDDEN, OF DETROIT, MICHIGAN, ASSIGNOR TO HIMSELF, GEORGE WATKINS, AND FRANK H. BLACKMAN, OF SAME PLACE.

KNOB ATTACHMENT.

SPECIFICATION forming part of Letters Patent No. 255,858, dated April 4, 1882.

Application filed February 4, 1882. (No model.)

*To all whom it may concern:*

Be it known that I, OLIVER M. HIDDEN, of Detroit, in the county of Wayne and State of Michigan, have invented new and useful Improvements in Door-Knob Attachments; and I hereby declare that the following is a full, clear, and exact description thereof, reference being had to the accompanying drawings, which form a part of this specification.

The nature of this invention relates to certain new and useful improvements in the construction in attachments to door-knobs, the object of the invention being to provide a means, simple in construction, for securing an adjustment of the knobs, so that they may be applied to doors of different thickness.

The invention consists in the peculiar construction of a serrated yoke, which engages with the serrated end of the spindle and is held in place by the shank, and in the peculiar construction, arrangement, and various combinations of the parts, all as more fully hereinafter set forth.

Figure 1:
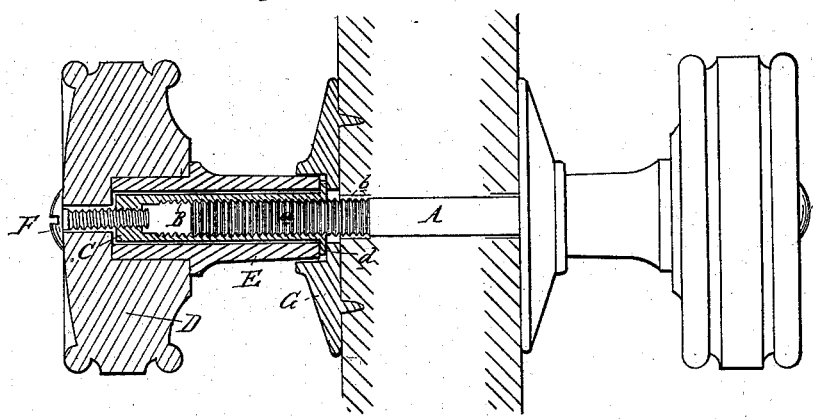
Figure 2:
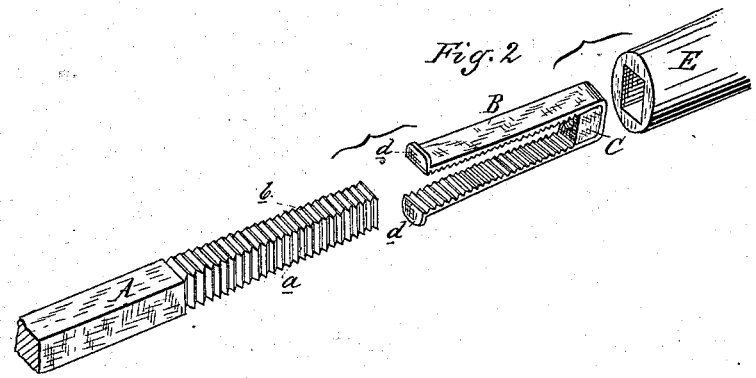

Figure 1 is a sectional elevation. Fig. 2 is a perspective, in detail, of the yoke and knob.

In the accompanying drawings, A represents the spindle of a door-knob attachment, a portion of the length of which at one end is provided with the serrations $a\ b$, the former being upon opposite sides of the spindle and the latter upon the opposite intermediate sides. The serrations $b$ are also so formed that they will occur alternately to or between the serrations $a$.

B represents a yoke, provided at one end with the solid or separate head C and at the opposite open end with the outwardly-projecting flanges $d$.

D represents the knob, which is rigidly secured upon its shank E, the latter of which is provided with a rectangular hole through its axial center for the reception of the yoke and spindle, the parts being held together by means of the screw F, which passes through the knob and engages with a threaded hole in the head of the yoke. The knob upon the opposite end of the spindle may be provided with the same means of adjustment, or it may be secured to place in any of the well-known methods.

In practice the spindle is inserted through the door, and the yoke B is slipped over the protruding end until the flanges thereof enter the socket in the rose G. The shank of the knob is then pushed upon the yoke, causing the engagement of the latter with the serrations upon the spindle, and the screw F is then inserted and screwed up, tightly binding the parts together. The alternating of the serrations upon the spindle admits of a finer adjustment than could otherwise be obtained.

If desired, the yoke can be bent from sheet metal, in which case the head C should be made separate.

What I claim as my invention is—

1. In a door-knob, the serrated spindle A, in combination with the serrated yoke B and the shank E, having a socket adapted to receive the yoke and close the same upon the spindle, substantially as described.

2. The combination, with the serrated spindle A, serrated yoke B, and the shank E, constructed substantially as described, of the screw F, adapted to draw the yoke within the shank, as and for the purpose specified.

OLIVER M. HIDDEN.

Witnesses:
H. S. SPRAGUE,
E. SCULLY.